(12) United States Patent
Sengupta et al.

(10) Patent No.: US 10,437,944 B2
(45) Date of Patent: Oct. 8, 2019

(54) SYSTEM AND METHOD OF MODELING IRREGULARLY SAMPLED TEMPORAL DATA USING KALMAN FILTERS

(71) Applicant: Conduent Business Services, LLC, Dallas, TX (US)

(72) Inventors: Abhishek Sengupta, Kolkata (IN); Prathosh Aragulla Prasad, Karnataka (IN); Satya Narayan Shukla, Hsinchu (TW); Vaibhav Rajan, Karnataka (IN); Katerina Sinclair, Tucson, AZ (US); Stephen Fullerton, Jacksonville Beach, FL (US)

(73) Assignee: Conduent Business Services, LLC, Florham Park, NJ (US)

( * ) Notice: Subject to any disclaimer, the term of this patent is extended or adjusted under 35 U.S.C. 154(b) by 863 days.

(21) Appl. No.: 15/083,466

(22) Filed: Mar. 29, 2016

(65) Prior Publication Data

US 2017/0286569 A1    Oct. 5, 2017

(51) Int. Cl.
| | | |
|---|---|---|
| *G06F 17/18* | (2006.01) | |
| *G06N 5/04* | (2006.01) | |
| *G06F 17/50* | (2006.01) | |
| *G06N 20/00* | (2019.01) | |
| *G06K 9/00* | (2006.01) | |

(52) U.S. Cl.
CPC ......... *G06F 17/5009* (2013.01); *G06F 17/18* (2013.01); *G06K 9/00536* (2013.01); *G06N 5/04* (2013.01); *G06N 20/00* (2019.01); *G06F 2217/10* (2013.01)

(58) Field of Classification Search
CPC ................................ G06F 17/18; G06N 5/05
See application file for complete search history.

(56) References Cited

U.S. PATENT DOCUMENTS

| | | | |
|---|---|---|---|
| 5,497,152 | A | 3/1996 | Wilson et al. |
| 5,717,617 | A | 2/1998 | Chester |
| 6,236,283 | B1 | 5/2001 | Koslov |
| 7,209,938 | B2 | 4/2007 | Lipp |
| 8,832,169 | B2 | 9/2014 | Sethuraman |

(Continued)

OTHER PUBLICATIONS

"A Hierarchical Switching Linear Dynamical System Applied to the Detection of Sepsis in Neonatal Condition Monitoring," Ioan Stanculescu et al., UAI'14 Proceedings of the Thirtieth Conference on Uncertainty in Artificial Intelligence, pp. 752-761, Quebec City, Quebec, Canada, Jul. 23-27, 2014 (Year: 2014).*

(Continued)

*Primary Examiner* — Hal Schnee
(74) *Attorney, Agent, or Firm* — Loza & Loza LLP; Kermit D. Lopez; Luis M. Ortiz

(57) ABSTRACT

Systems and methods of modeling irregularly sampled time series signals with unknown temporal dynamics are disclosed wherein a temporal difference variable (TDV) is introduced to model irregular time differences between subsequent measurements. A hierarchical model is designed comprising two linear dynamical systems that model the effects of evolving TDV on temporal observations. All the parameters of the model, including the temporal dynamics, are statistically estimated using historical data.

20 Claims, 8 Drawing Sheets

(56) References Cited

U.S. PATENT DOCUMENTS

| | | | |
|---|---|---|---|
| 2003/0014147 A1* | 1/2003 | Ignagni | D21G 9/0054 700/129 |
| 2009/0244395 A1 | 10/2009 | Druck | |
| 2014/0184273 A1* | 7/2014 | Feizi-Khankandi | H03M 1/1265 327/91 |
| 2015/0133778 A1* | 5/2015 | Barriga Rivera | A61B 5/0035 600/427 |
| 2017/0181711 A1* | 6/2017 | Cheng | A61B 5/7275 |

OTHER PUBLICATIONS

"Kalman Filtering," Dan Simon, Embedded Systems Programming Jun. 2001, pp. 72-79 (Year: 2001).*

"Kalman Filter Analysis of Precision Clocks With Real-Time Parameter Estimation," S.R. Stein, 43rd Annual Symposim on Frequency Control—1989, CH2690-6/89/0000-232 $1.00 C 1989 IEEE (Year: 1989).*

"State estimator for multisensor systems with irregular sampling and time-varying delays," I. Penarrocha et al., International Journal of Systems Science • Aug. 2012, DOI: 10.1080/00207721.2011. 625482 (Year: 2012).*

* cited by examiner

SYSTEM AND METHOD OF MODELING IRREGULARLY SAMPLED TEMPORAL DATA USING KALMAN FILTERS

FIELD OF THE INVENTION

Embodiments are generally related to the field of machine learning. Embodiments are also related to methods and systems for data modeling. Embodiments are further related to methods and systems for modeling irregularly sampled temporal data.

BACKGROUND

A Linear Dynamical System (LDS) can be used for time series analysis and modeling. For example, an LDS can be used to model sequences of measurements and underlying sequences of states that represents the system dynamics, with the assumption that both the state-evolution and measurement sequences may be corrupted by noise. Such models attempt to capture the dynamics of the system states that govern the temporal evolution of the measurements.

In some cases, an LDS has a deterministic iterative closed-form solution, given the knowledge of system dynamics and parameters of the noise involved. In most cases, the system dynamics are known from the properties of the physical system being modeled. For example, in a navigation system the physical laws of motion determine the system dynamics. However, when the system dynamics are unknown, the parameters of an LDS are determined using statistical methods.

Many prior art approaches, however, assume that both observation and state variables are uniformly sampled; that is, the time difference between any two successive measurement instants can be assumed to be a constant. In reality this assumption is often not valid.

For example, irregularly sampled data often arises in clinical time-series where the human physiological vitals such as blood pressure, heart rate, and respiration rate form the observation sequence. These metrics are monitored in hospitals to evaluate the physiological condition of a patient and stored in Electronic Medical Records (EMR). Typically, vital signs are recorded every 3-4 hours. However, this interval may vary widely depending on hospital protocols and severity of the patient. In critical care, measurements may be made at intervals ranging from a second to a minute. An LDS cannot be readily applied for such data with irregular sampling.

Attempts have been made to address the issue of irregular sampling under the framework of LDS. A popular scheme that is often used is the lifting technique where the observations and state variables are binned into regular periodic intervals in an attempt to convert time varying multi-rate systems into a time-invariant single rate system. While this approach is applicable for problems where the sampling pattern is periodic over a larger interval, it becomes intractable when the samples are completely irregularly sampled.

Other attempts to model irregularly sampled time-series data have also been proposed. In an approach called the direct value interpolation, a pre-specified fixed sampling rate is assumed and observation values at these points are interpolated using various techniques. Further, this interpolated time-series is used to train a regular LDS. Another approach is the window-based segmentation approach which is similar to the lifting-based technique. Here the time-series is first segmented to intervals of fixed-sized windows. Subsequently, the behavior in each window is summarized in terms of its statistics which are then used in a model. In both of these approaches, the principle is to convert an irregularly sampled time series into a uniformly sampled time-series and subsequently use it in an LDS. Recently, multi-task Gaussian processes (MTGP) have been used to model this kind of data, where the issue of irregular sampling is inherently addressed by using time-dependent kernels which take the instant at which the measurements are made as inputs.

None of the prior art approaches, however, directly model an irregularly sampled time-series. Accordingly, there is a need in the art for methods and systems that address the problem of irregularly sampled temporal data.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for machine learning.

It is another aspect of the disclosed embodiments to provide a method and system for modeling data.

It is another aspect of the disclosed embodiments to provide a method and system for modeling irregularly sampled data.

It is another aspect of the disclosed embodiments to provide a method and system for modeling irregularly sampled medical data.

It is another aspect of the disclosed embodiments to provide methods and systems for identifying medical conditions.

It is yet another aspect of the disclosed embodiments to provide an enhanced method and system for modeling irregularly sampled temporal data using Kalman filters.

The aforementioned aspects and other objectives and advantages can now be achieved as described herein. Systems and methods of modeling irregularly sampled time series signals with unknown temporal dynamics are disclosed wherein a temporal difference variable (TDV) is introduced to model irregular time differences between subsequent measurements. A hierarchical model is designed comprising two linear dynamical systems that model the effects of evolving TDV on temporal observations. All the parameters of the model, including the temporal dynamics, are statistically estimated using historical data. The data is modeled without any intermediate transformations to regularly sampled time series.

In an exemplary embodiment, a method and system for data forecasting using machine learning comprises collecting a dataset with an irregular temporal sampling rate, defining a state equation according to the collected dataset with the irregular temporal sampling rate, defining a temporal difference variable to account for the irregular temporal sampling rate, incorporating the temporal difference variable into the state equation in order to form a linear dynamic system model, and forecasting future expected data in the dataset according to the linear dynamic system model.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
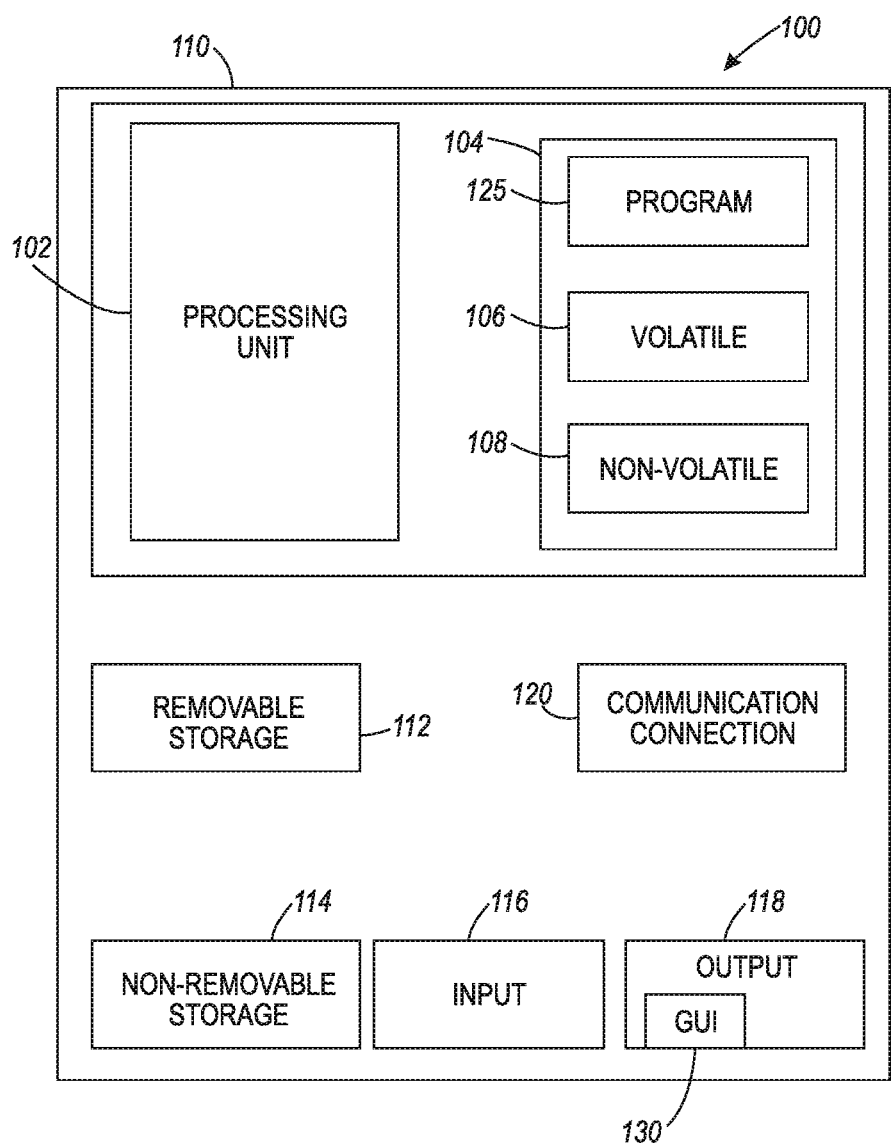
FIG. 1 depicts a block diagram of a computer system which is implemented n accordance with the disclosed embodiments.
Figure 2:
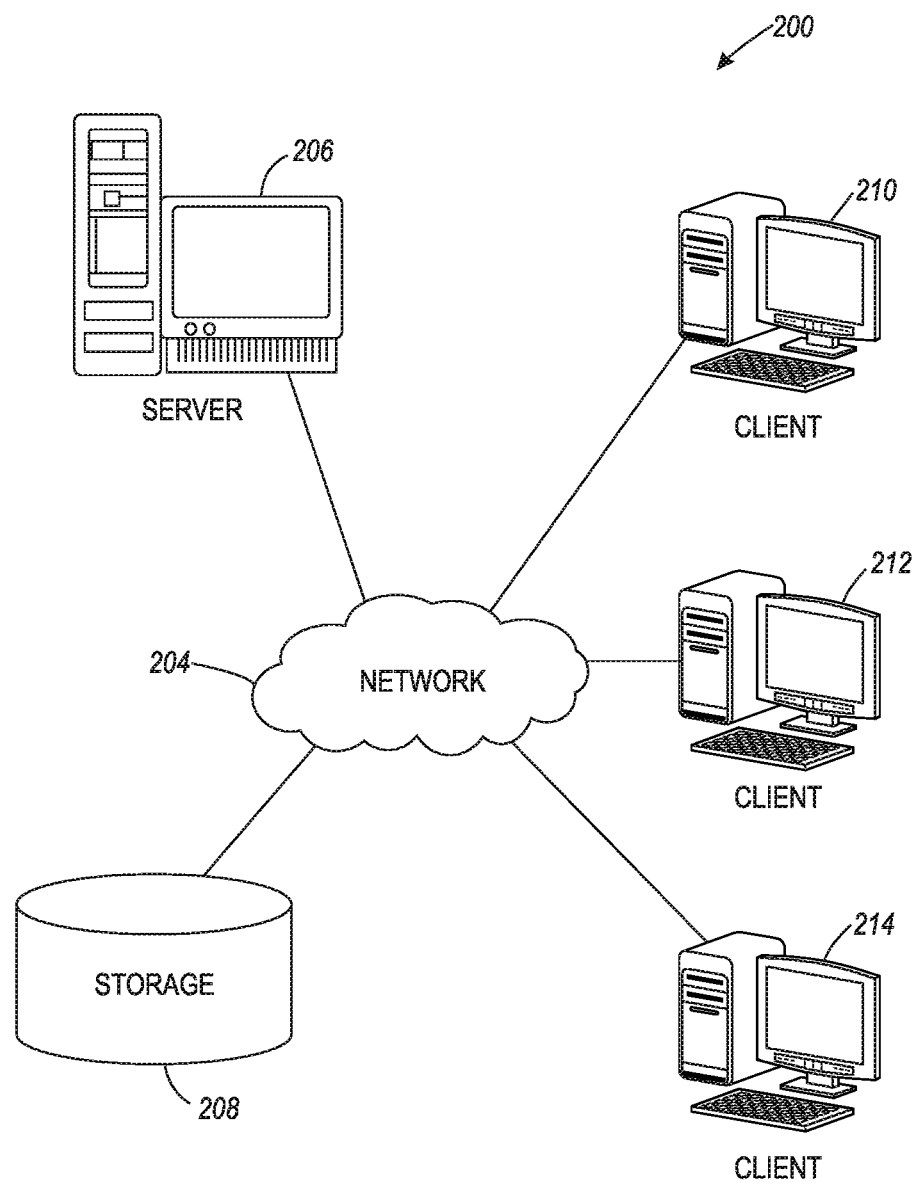
FIG. 2 depicts a graphical representation of a network of data-processing devices in which aspects of the present invention may be implemented.
Figure 3:
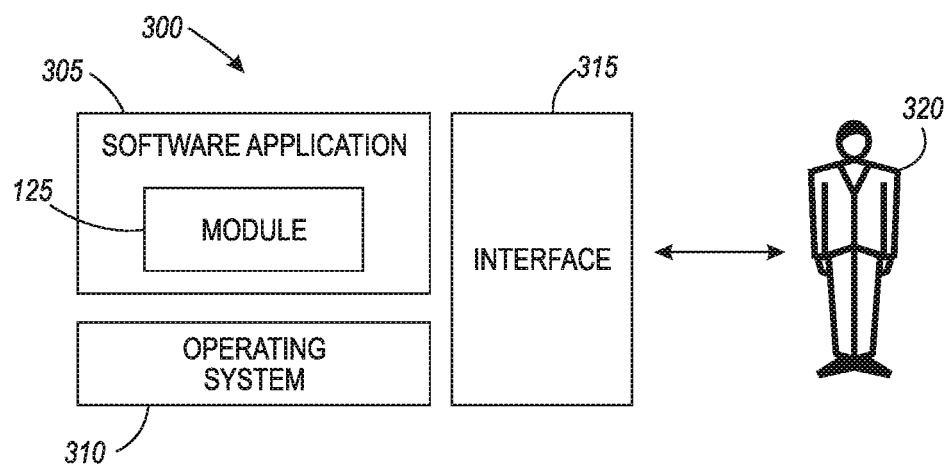
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, acid a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 204 in communication with one or more clients 210, 212, and 214. Network 202 is a medium that can be used to provide communications links between various devices and computers connected together within a networked data processing system such as computer system 100. Network 204 may include connections such as wired communication links, wireless communication links, or fiber optic cables. Network 204 can further communicate with one or more servers 206, one or more external devices such as sensor, and a memory storage unit such as, for example, memory or database 208.

In the depicted example, sensor and server 206 connect to network 204 along with storage unit 208. In addition, clients 210, 212, and 214 connect to network 204. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, sensor, medical sensor, etc.

Computer system 100 can also be implemented as a server such as server 206, depending upon design considerations. In the depicted example, server 206 provides data such as boot files, operating system images, applications, and application updates to clients 210, 212, and 214, and/or to sensor. Clients 210, 212, and 214 and sensor are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 204 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as the computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. The software application 305 may include one or more application programs, such as module(s) 125, which may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may be then acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments, which can be implemented in the context of a data-processing system such as computer system 100, in conjunction with program module 125, and data-processing system 200 and network 204 depicted in FIGS. 1-2. The embodiments, however, are not limited to any particular application or any particular environment. Instead, those skilled in the art will find that the system and method of the embodiments may be advantageously applied to a variety of system and application software including database management systems, word processors, and the like. Moreover, the embodiments may be implemented via on a variety of different platforms including Macintosh, UNIX, LINUX, and the like. Therefore, the descriptions of the exemplary embodiments, which follow, are for purposes of illustration and not considered a limitation.

A Linear Dynamical System (LDS) can be used extensively in multiple disciplines of science and engineering for modeling temporal data. Within an LDS setting, the observation and state-variables are assumed to be uniformly sampled in time with a fixed sampling rate. However, in many applications, observation sequences are irregularly sampled and thus an LDS may not be directly used to model such data.

The methods and systems described herein provide methods and systems based on LDS that can directly fit such irregularly sampled data. The performance of the methods and systems are empirically better than state-of-the-art statistical techniques for modeling irregularly sampled data. The methods and systems also provided improved detection of sepsis in patients. The methods and systems may be extended to provide improved detection and monitoring of various medical conditions.

In accordance with an embodiment, a general LDS, also known as a Kalman filter, (KF) may be described by equations (1) and (2).

$$z_t = A z_{t-1} + \epsilon_t \quad (1)$$

$$y_t = C z_t + \delta_t \quad (2)$$

In equations (1) and (2), $z_t \in \mathbb{R}^k$ and $y_t \in \mathbb{R}$, respectively denote the hidden or state-space variables and observation variables at discrete time intervals $t \in \{1, \ldots, N\}$. $A_{k \times k}$ and $C_{p \times k}$, respectively denote the state-transition and observation matrices; $\epsilon_t$ and $\delta_t$ are the noise corrupting the state-space and observation variables, respectively.

By definition, the LDS, as described in equations (1) and (2), assumes both observation and state variables to be uniformly sampled. That is, the time difference between any two successive measurement instants is assumed to be a constant. Formally, let $y_i$ represent the $i^{th}$ observation sequence of length $T_i$ where $y_i = \{y_{it1}, \ldots, t_{iti}\}$ and there are N such sequences in the dataset. Note that $y_i \in \mathbb{R}^{p \times T_i}$ and in general that $T_i \neq T_j$ for $j \neq i$. An irregularly sampled observation sequence can be defined by equation (3) if equation (3) is not a constant for all possible pairs of u, v, $\leq T_i$.

$$\forall y_i, t_u \sim t_v \quad (3)$$

Also, not all p dimensions may be observed at a given observation instant.

There are many examples of irregularly sampled data, especially when the data is acquired through manual observations. An example of such data arises in clinical time-series where the human physiological vital signs such as blood pressure, heart rate, and respiration rate form the observation sequence. In an embodiment, these vitals are monitored in hospitals to evaluate the physiological condition of a patient and stored in Electronic Medical Records (EMR). The nature of such data lends itself to recordation every 3-4 hours. However, the interval may vary widely depending on hospital protocols and the severity of the patient. In critical care, measurements may be made at intervals ranging from a second to a minute to several hours. In other embodiments, such data may come from chemical process industries where composition and manipulated variables are manually measured at two different rates. These are two examples of irregularly sampled data and many other data sets associated with other applications also exist.

The methods and systems disclosed herein provide a new temporal model for irregularly sampled data. The key is to extend the LDS so that it can directly model an irregularly sampled time-series by incorporating a temporal difference variable. The LDS can thus be directly fitted to irregularly sampled data without any intermediate transformations. Further, in these models, data imputation is not required. In an embodiment, the model can be derived for irregularly sampled clinical time-series for imputation and prediction tasks. The methods and systems further have applications in healthcare analytics. For example, the methods and systems disclosed herein can be used in forecasting vital signs of patients, which in turn can be used to provide timely alerts when vital signs are expected to deviate from the normal range significantly. This can improve patient triage and results in better care in hospitals.

In an embodiment, a system and method of modeling irregularly sampled time series signals with unknown temporal dynamics includes introduction of a temporal difference variable (TDV) to model irregular time differences between subsequent measurements. A hierarchical model is designed comprising two linear dynamical systems that model the effects of the evolving TDV on temporal observations. All the parameters of the model, including the temporal dynamics, are statistically estimated using historical data. The data is modeled without any intermediate transformations to regularly sampled time series. The system and methods can provide timely clinical alerts for identifying high-risk patients for sepsis. The methods and systems also provide forecasting for multiple correlated physiological signal values for patients.

Dealing with irregular temporal samples requires the introduction of a variable called the temporal difference variable (TDV) $\Delta$ which is defined as follows. For an observation sequence, given a pair of observations instances $t_u$ and $t_v$, with $u \geq v$, $\Delta$ is a p dimensional vector as illustrated in equation (4) if $i^{th}$ data dimension is observed at both $t_u$ and $t_v$ and zero otherwise.

$$\Delta^i_{t_u,t_v} = t_u - t_v \quad (4)$$

The variable $\Delta$ can be included in the state equation of the LDS so that the state (and thus the observation) at a given time not only depends on the previous state (and observation), but also on the time instant at which the previous observation was made. In one embodiment, this information can be incorporated directly in an LDS in what is known as model KF2. Empirically, KF2 represents a significant improvement over prior art in forecasting performance since it accounts for irregular sampling.

In another embodiment, further improvements are realized by taking into account the evolution of $\Delta$ itself as shown below for what is known as model KF3. This embodiment is empirically superior to both prior art methods and systems and the embodiment making use of model KF2.

Figure 4:
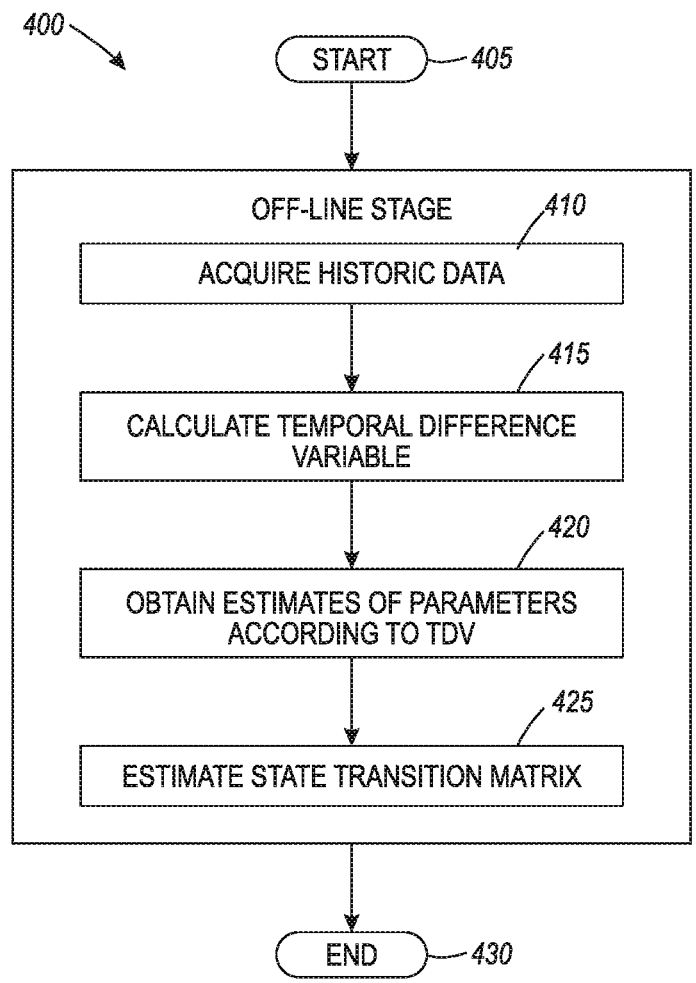
FIG. 4 depicts a flow chart illustrating logical operational steps associated with an offline training stage in accordance with the disclosed embodiments.

Model training may be required before the methods and systems can be applied to real world applications. FIG. 4 illustrates a high level method 400 for training a KF2 model in accordance with the embodiments disclosed herein. The method begins at step 405.

In order to train a KF2 model, input measurements and their associated timestamps for a selected history of data (for example, of patients) can be acquired at step 410. This data is used to calculate a temporal difference variable at step 415. The equations (5) and (6) can be fit to the data and temporal difference variable at step 420, in order to obtain estimates of the parameters (A, B, C, Q, and R). The state transition matrix can thus be estimated at step 425 and the trained model KF2 is ready for deployment in online applications. The method ends at step 430. A more detailed description of this method is provided herein.

In the KF2 model embodiment, A is linearly scaled by a matrix and added in the state-equation. This is shown mathematically in equations (5) and (6) where $z_t \in \mathbb{R}^k$ denotes the hidden states; $A_{k \times k}$ denotes the state transition matrix; $\Delta_{t,t-1}$ denotes the TDV between the $t^{th}$ and $(t-1)^{th}$ observations; $y_t \in \mathbb{R}^p$ denotes the observations; $C_{p \times k}$ denotes the observation matrix which maps the hidden state space into the observed space.

$$z_t = A z_{t-1} + B \Delta_{t,t-1} + \in_t \quad (5)$$

$$y_t = C z_t + \delta_t \quad (6)$$

Assume that both the process noise and observation noise are zero-mean Gaussian with an unknown co-variance, that is, provided by equation (7).

$$\in_t \sim \mathcal{N}(0, Q), \delta_t \sim \mathcal{N}(0, R) \quad (7)$$

It should be noted that t and (t-1) are used just for notational convenience and they only denote the successive measurement instants in time. Note that in this embodiment, the hidden states at a given time depend on the previous state and also the temporal differences of the measurement instants through B.

For irregularly sampled data, the noise statistics as well as the system dynamics are unknown. Thus, it is necessary to include both the noise statistics and system dynamics in the parameter set, and learn them through a maximum likelihood approach using the data, taking into account the irregular sampling through the term $B \Delta_{t,t-1}$. Thus, the complete set of parameters is (A, B, C, Q, R). It should be appreciated that in this embodiment, the TDV does not directly alter the system dynamics in that it does not affect the A matrix directly. Further, it is noteworthy that the TDV Δ is also a temporally evolving parameter.

In another embodiment, in order to account for the fact that the TDV does not directly alter the system dynamics and that the TDV Δ is a temporally evolving parameter as in the KF2 model, a hierarchical LDS model (i.e., the KF3 model) where two filters—one on $\Delta_{t,t-1}$ and the other on y are used. Both the LDS are trained simultaneously using the data.

Figure 5:
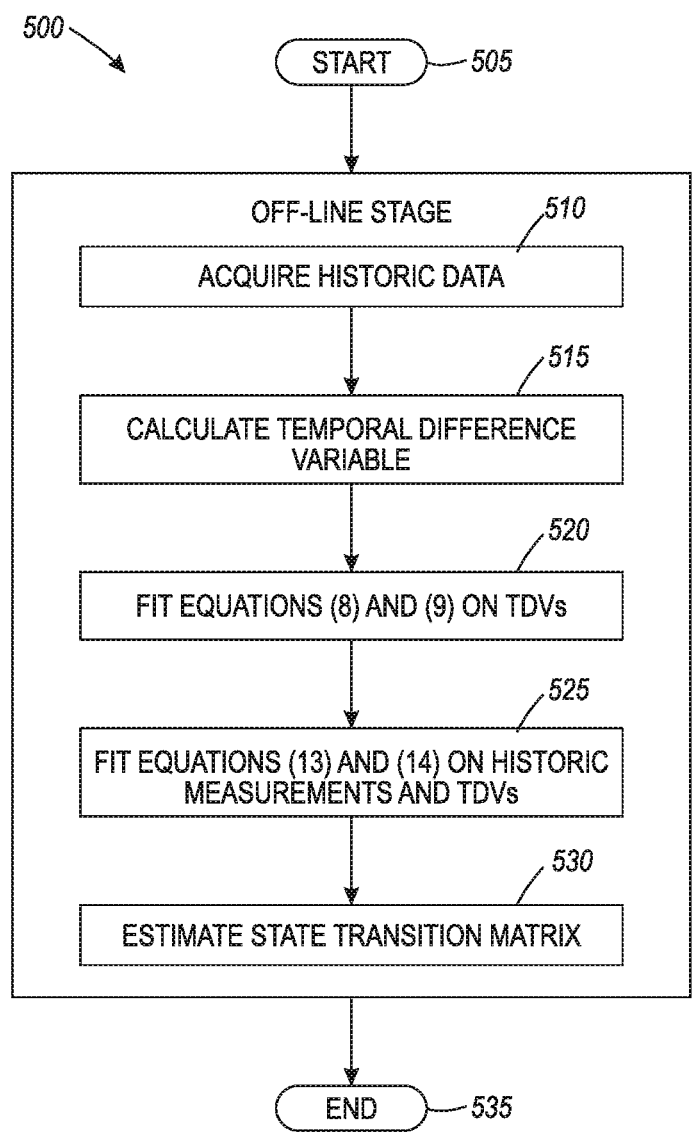
FIG. 5 depicts a flow chart illustrating logical operational steps associated with an alternative offline training stage in accordance with the disclosed embodiments.

Training for a KF3 model may be required before the methods and systems can be applied to real world applications. FIG. 5 illustrates a high level flow chart of a method 500 for training a KF3 model in accordance with the embodiments disclosed herein. The method begins at step 505.

As in the KF2 model, in order to train the KF3 model historical data is provided including measurements and timestamps for such measurements as shown at step 510. The historical data is used to calculate the temporal difference variables as shown at step 515.

Next, at step 520, equations (8) and (9) are fit, on the temporal difference variables using statistical methods such as expectation maximization. At step 525, equations (13) and (14) are fit on the measurements and the temporal difference variables again using statistical methods such as expectation maximization. The parameters determined in steps 520 and 525 are then used to obtain estimates of the state transition matrix for model KF3 at step 530. The parameters for model KF3 are thus known and the KF3 model is trained and ready for deployment. The method ends at step 535. The details of this method are provided below.

The filter for $\Delta_{t,t-1}$ can be formulated as shown in equations (8) and (9).

$$\tilde{\Lambda}_{t,t-1} = \tilde{A}\tilde{\Lambda}_{t-1,t-2} + \tilde{\epsilon}_t \quad (8)$$

$$\Delta_{t,t-1} = \tilde{C}\tilde{\Lambda}_{t,t-1} + \tilde{\delta}_t \quad (9)$$

where equation (10) denotes the hidden states $$\tilde{\Lambda}_{t,t-1} \in \mathbb{R}^k \quad (10)$$

$\tilde{A}$ denotes the k×k state transition matrix. Equation (11) gives the process noise with error covariance $\tilde{Q}$.

$$\tilde{\epsilon}_t \sim \mathcal{N}(0,\tilde{Q}) \quad (11)$$

$\Delta_{t,t-1} \in \mathbb{R}^p$ denotes the observations and $C_{p \times k}$ denotes the observation matrix which maps the true state space into the observed space. Equation (12) gives the observation noise with error covariance $\tilde{R}$.

$$\tilde{\delta}_t \sim \mathcal{N}(0,\tilde{R}) \quad (12)$$

The parameters of this LDS are given by ($\tilde{A}, \tilde{C}, \tilde{Q}, \tilde{R}$).

The parameters of the model are determined from a sequence of N observations $\Delta_i = \{\Delta_{i,2,1}, \ldots, \Delta_{i,Ti,Ti-1}\}$; where i=1(1)N y using the EM algorithm. The model for $y_t$ can be formulated as equations (13) and (14).

$$z_t = Az_{t-1} + \epsilon_t \quad (13)$$

$$y_t = Cz_t + \delta_t \quad (14)$$

where, $z_t \in \mathbb{R}^k$ denotes the hidden states. A denotes the k×k state transition matrix at time t. Equation (15) is the process noise with error covariance Q.

$$\epsilon_t \sim \mathcal{N}(0,Q) \quad (15)$$

$y_i \in \mathbb{R}^p$ denotes the observations and $C_{p \times k}$ denotes the observation matrix which maps the true state space into the observed space. Equation (12) is the observation noise with error covariance R.

$A_t$ is modeled as $A_t = A + B\tilde{\Delta}_{t,t-1}$, where $\tilde{\Delta}_{t,t-1}$ denotes the k×k diagonal matrix with the diagonal entries as $\tilde{\Lambda}_{t,t-1}$, (the hidden states corresponding to equation (8) and (9)). Note that $A_t$ accumulates the effect of the covariate $\tilde{\Delta}_{t,t-1}$ of the TDV on the final state sequence $z_t$ and is a time-varying matrix. The parameters of this LDS (A, B, C, Q, R) are also learned from a sequence of N observations $y_i$ using the EM algorithm.

In one embodiment, parameters can be estimated for the KF2 model. For the model described in equations (5) and (6), the likelihood of the data (for a single observation sequence) is given by equation (16).

$$L(\theta | D) = p(z_1) \prod_{t=2}^{T} p(z_t | z_{t-1}) \prod_{t=1}^{T} p(y_t | z_t) \quad (16)$$

$$p(z_1) \sim \mathcal{N}(\mu_1, \Sigma_1); p(z_t | zt-1) \sim \mathcal{N}(Az_{t-1} + B\Delta_{t,t-1}, Q);$$

$$p(y_t | z_t) \sim \mathcal{N}(Cz_t, R).$$

Assuming $z_t$ is Markovian and from equations (5), (6) and (16), the log likelihood/(θ|D) for N observation sequences is given by equation (17).

$$-\frac{1}{2}N\log|\Sigma_1| - \frac{1}{2}\sum_{i=1}^{N} X'\Sigma_1^{-1}X - \sum_{i=1}^{N}\sum_{t=2}^{T_i}\left\{\frac{1}{2}Y'Q^{-1}Y\right\} - \quad (17)$$

$$\frac{1}{2}\sum_{i=1}^{N}(T_i - 1)\log|Q| - \sum_{i=1}^{N}\sum_{t=2}^{T_i}\left\{\frac{1}{2}Z'R^{-1}Z\right\} -$$

$$\frac{1}{2}\sum_{i=1}^{N}T_i\log|R| - \frac{1}{2}\sum_{i=1}^{N}T_i(p+k)\log 2\Pi$$

where $X = (z_{i1} - u_1)$ and $Y = (z_{i1} - Az_{i(t-1)} - B\Delta_{i,t,t-1})$ and $Z = (y_{it} - Cz_{it})$.

The log-likelihood function is used to estimate the parameters using EM framework. Equations (18), (19), and (20) state the update equations for i-th iteration for the parameters A, B and C below and others similarly learned.

$$A^{(i)} = \quad (18)$$

$$\left(\sum_{i=1}^{N}\sum_{t=2}^{T_i} \widetilde{z_{it}z'_{i(t-1)}} - \sum_{i=1}^{N}\sum_{t=2}^{T_i} B^{(i-1)}\Delta_{i,t-1}\widetilde{z'_{i(t-1)}}\right) \times \left(\sum_{i=1}^{N}\sum_{t=2}^{T_i} \widetilde{z_{i(t-1)}z'_{i(t-1)}}\right)^{-1}$$

$$B^{(i)} = \left(\sum_{i=1}^{N}\sum_{t=2}^{T_i} \widetilde{z_{it}}\Delta'_{i,t,t-1} - \sum_{i=1}^{N}\sum_{t=2}^{T_i} A^{(i)}\widetilde{z_{i(t-1)}}\Delta'_{i,t,t-1}\right) \times \quad (19)$$

$$\left(\sum_{i=1}^{N}\sum_{t=2}^{T_i} \Delta_{i,t,t-1}\Delta'_{i,t,t-1}\right)^{-1}$$

$$C^{(i)} = \left(\sum_{i=1}^{N}\sum_{t=1}^{T_i} y_{it}\widetilde{z'_{it}}\right)\left(\sum_{i=1}^{N}\sum_{t=1}^{T_i} \widetilde{z_{it}z'_{it}}\right)^{-1} \quad (20)$$

where equations (21), (22), and (23) are obtained Kalman smoothing and filtering equations.

$$\widetilde{z_{it}z'_{it}} = E(z_{it}|y_{1:T_i}) \quad (21)$$

$$\widetilde{z_{it}z'_{it}} = E(z_{it}z_{it}'|y_{1:T_i}) \quad (22)$$

$$\widetilde{z_{it}z'_{i(t-1)}} = E(z_{it}z_{i(t-1)}'|y_{1:T_i}) \quad (23)$$

In another embodiment the parameters for the KF3 model are determined. For the case of KF3, note that there are two LDS given Eq. 3 and 4. For the LDS described by equations (8), (9), (13), and (14), parameters are estimated using update equations as is understood in the art. For the LDS described by equations (13) and (14), the log-likelihood is identical to equation (17) except that $Y=(z_{it}-Az_{i(t-1)}-B\hat{\Delta}_{i,t,t-1}z_{i(t-1)})$. Note that $\hat{\Delta}_{i,t,t-1}$ is obtained from state-equations of LDS given by equations (8) and (9). The parameters for this LDS are obtained using EM in the same way as that for the KF2 Model.

Figure 6:
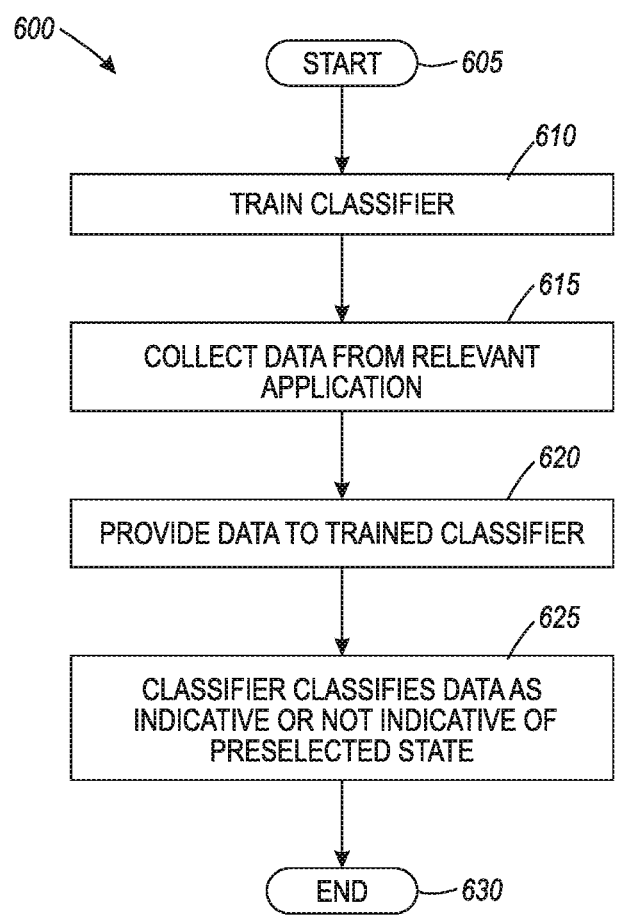
FIG. 6 depicts a flow chart illustrating logical operational steps associated with a method for data forecasting in accordance with the disclosed embodiments.

In general the trained models can be deployed in data forecasting applications. FIG. 6 illustrates a flow chart of steps associated with a method 600 for data forecasting in accordance with the disclosed embodiments. The method 600 begins at step 605. At step 610, historical data associated with the desired application can be used to train the classifier (e.g., model KF2 or KF3) as illustrated in FIG. 4 or FIG. 5.

Data associated with the present application can be collected as shown at step 615. In general, such data may comprise irregularly sampled data. The collected data is provided to the trained classifier at each time instance as shown at step 620. It should be understood that this data may be provided in real time and/or may be previously collected data.

The trained classifier thus classifies the irregularly sampled data as indicative or not indicative of a predefined state, according to the state equation as shown at step 625. It should be understood that with the state equation well defined and the associated parameters determined, the classification can be accomplished using any one of several well-known techniques. The method then ends at step 630.

Figure 7:
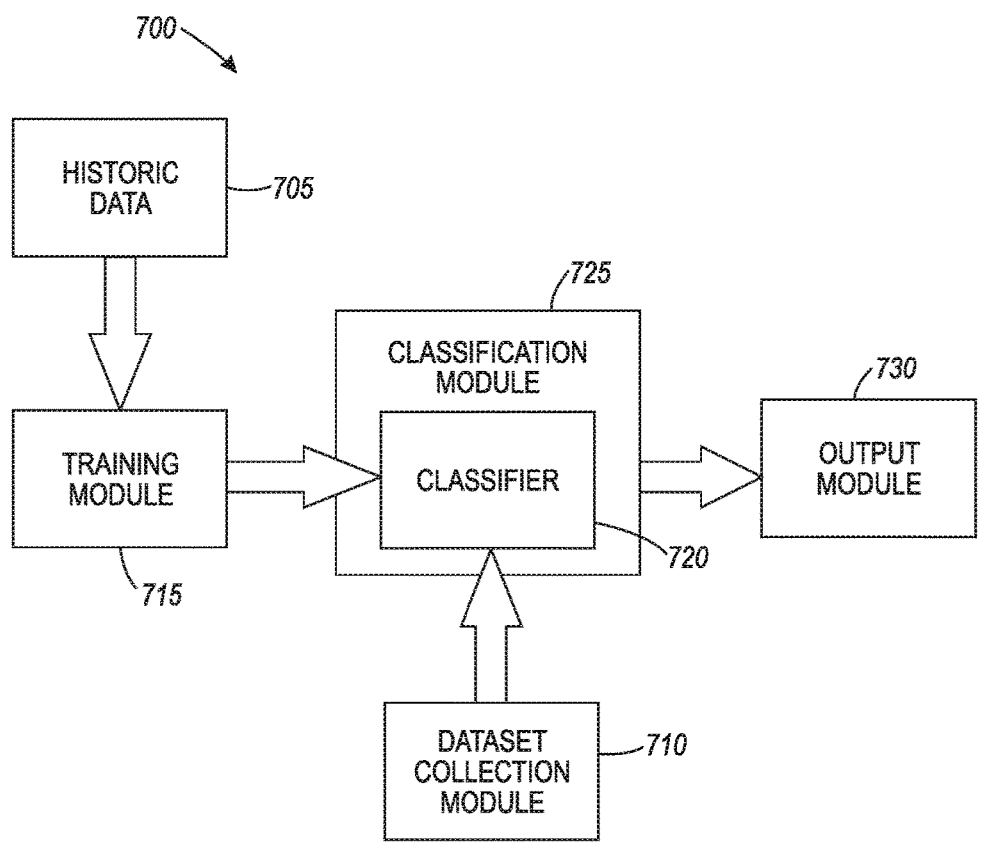
FIG. 7 depicts a block diagram of modules associated with a system and method for data forecasting in accordance with disclosed embodiments.

FIG. 7 illustrates a block diagram of a system 700 for data forecasting in accordance with an embodiment of the invention. As illustrated, historic data 705 can be provided to training module 715. It should be appreciated that historic data 705 can comprise irregularly sampled training data. Training module 715 is used to train a classifier 720 associated with classification module 725.

Once the classifier 720 is trained, dataset collection module 710 can be used to collect and/or otherwise provide actionable data to the classifier 720. Classifier 720 evaluates the collected data to determine if the data is or is not indicative of a preselected condition according to each sample provided by data collection module 710. It should be understood that dataset collection module 710 may intermittently provide updated data samples in real time as the data samples are taken. Such data samples may be taken irregularly. The classification module can provide an output to output module 730 which reports the results of the classification to a user.

In one exemplary embodiment, the trained temporal models KF2 or KF3 disclosed herein can be used in conjunction with physiological signals in Clinical Decision Support Systems (CDSS). For example, methods and systems for sepsis detection are provided in an embodiment.

Sepsis is a life-threatening complication that affects 0.8 to 2 million patients in the US alone each year for which the hospital mortality rate ranges from 18% to 60%. Many billions are spent on hospitalizations related to sepsis. Sepsis is defined as the presence of Systemic Inflammatory Response Syndrome (SIRS) with a known or suspected infection. SIRS describes an inflammatory response of the body and can be identified by two or more of the following criteria: (1) temperature greater than 38 degrees Celsius or less than 36 degrees Celsius; (2) heart rate of greater than 90 beats per minute; (3) respiratory rate of greater than 90 breaths per minute; and (4) white blood cell counts of greater than 12000 cells/mm or less than 4000 cells/mm.

The SIRS criteria given above can be used to detect sepsis in patients. Clinical guidelines recommend antibiotic intervention as soon as SIRS criteria are met which improves outcomes for sepsis patients. However, for low risk patients, the risk of aggressive treatment outweighs its benefits. Hence, it is important to detect sepsis accurately and reduce false positives during detection. In general, low false positive rates are a practical requirement in CDSS systems—higher false positives lead to alarm fatigue and finally loss in confidence in such systems.

The embodiments disclosed herein provide sepsis detection. In particular, models KF2 or KF3 can be used to learn at least one distinguishing characteristic of non-sepsis patients, which in turn can be used as a feature to improve the accuracy of identifying sepsis patients.

Figure 8:
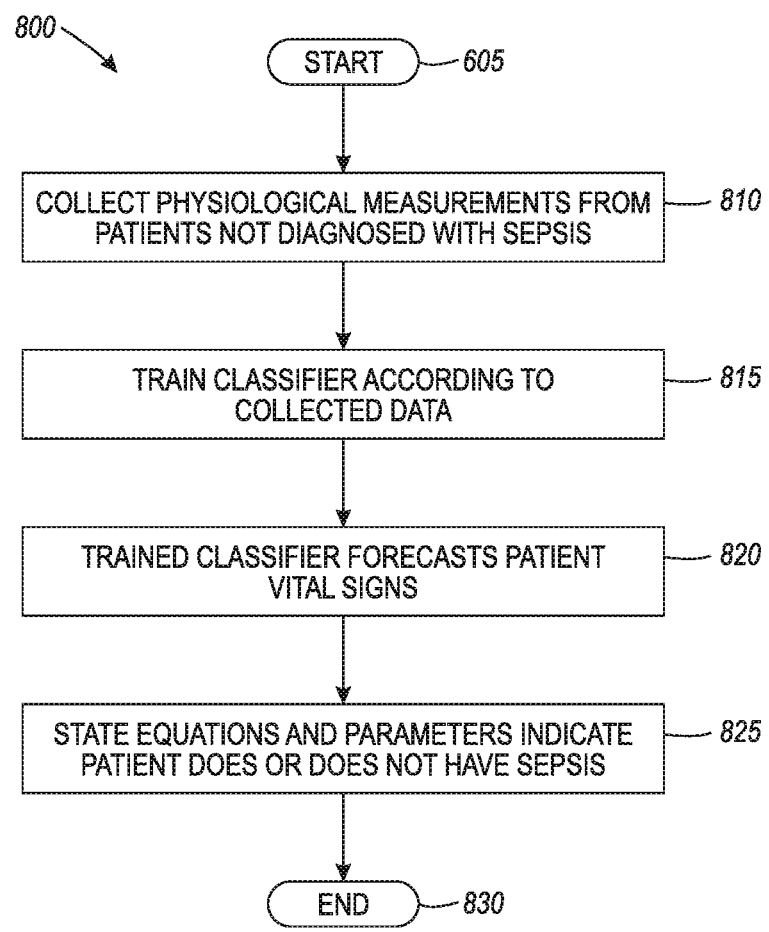
FIG. 8 depicts a flow chart illustrating steps in a method for diagnosing sepsis in accordance with the disclosed embodiments.

FIG. 8 illustrates a method for sepsis detection 800 in accordance with an exemplary embodiment. The method starts at step 805. Temperature, respiration rate, and heart rate signals of patients who were not diagnosed with sepsis can be collected at step 810 to train the KF2 or KF3 Kalman filter based model. Machine learning as described in FIG. 4 and/or FIG. 5 can then be used to train the model to identify the system dynamics of non-sepsis patients as illustrated at step 815. The trained KF2 or KF3 model can then forecast vital signs for both training and test patients in a classification system according to the state equations and parameters of the trained model using well known methods. The forecast error (RMSE) can be used as a feature within the classifier. Thus, the vital signs of a patient can be used to build classification models that can distinguish patients with sepsis from patients without sepsis as shown at step 830. The mean and standard deviation of temperature, respiration rate, and heart rate signals can be used as features for classification. The method ends at step 830.

In an embodiment, both non-sepsis patients and patients with sepsis can be in the dataset and 5-fold cross validation can be used to train and test the respective subsets. The performance metrics can be sensitivity and specificity. Sensitivity is defined as the accuracy with which sepsis patients are identified in the test data and specificity is defined as the accuracy with which non-sepsis patients are identified in the test data.

Table 1 shows the results of using three different classifiers (RF, LR and SVM) for this dataset. Classifier settings are chosen to maintain 99% specificity (less than 1% false positive rate).

| | Without RMSE feature | | With RMSE feature | | |
|---|---|---|---|---|---|
| Classifier | Specificity | Sensitivity | Specificity | Sensitivity | Sensitivity Improvement |
| RF | 99.1% | 16.4% | 99.1% | 21.9% | 33.5% |
| LR | 99.2% | 14% | 99.1% | 18.2% | 30% |
| SVM | 99.1% | 17.3% | 99.2% | 10.9% | 10.4% |

Features can then be added; one for each vital (in this case 3 features). RMSE values of the forecasts are obtained from the KF3 model trained on only non-sepsis patients. These features quantitatively depict how much the vitals deviate from those of non-sepsis patients, and are expected to be lower for non-sepsis patients and higher for sepsis patients. When the same classifiers are tested with these additional features, a significant improvement in the predictive accuracy is realized. At the same specificity, a marked increase in sensitivity is achieved compared to the values obtained when these features are not used.

The disclosed embodiments provide a Kalman Filter based model to fit irregularly sampled time-series data. A new variable called the time-difference variable (TDV) captures the dependencies of the current state and observation variables on the previous measurement instants. The new model KF3 is a hierarchical model with two filters using the TDV. The trained model can be used as a classifier for patient data consisting of vitals including blood pressure and respiration rate measured intermittently during a patients hospital stay. Experiments show that forecasts and imputed values using the model are significantly more accurate than using traditional Kalman Filter based models that do not take irregular sampling into account as well as state-of-the-art multi-task Gaussian process models. Such forecasting systems can be used in Clinical Decision Support Systems, for example, to identify high-risk patients.

Based on the foregoing, it can be appreciated that a number of embodiments, preferred and alternative, are disclosed herein. For example, in one embodiment, a method for data forecasting using machine learning comprises collecting a dataset with an irregular temporal sampling rate, defining a state equation according to the collected dataset with the irregular temporal sampling rate, defining a temporal difference variable to account for the irregular temporal sampling rate, incorporating the temporal difference variable into the state equation in order to form a linear dynamic system model, and forecasting future expected data in the dataset according to the linear dynamic system model.

In an embodiment, the method further comprises estimating at least one parameter associated with the linear dynamic system model according to historical data. The at least one parameter comprises at least one parameter indicative of temporal dynamics.

In another embodiment, the linear dynamic system model comprises a KF2 model. In another embodiment, the linear dynamic system model comprises a KF3 model. The temporal difference variable is a temporal evolving parameter of the KF3 model.

In another embodiment, the dataset comprises data associated with one of patient vital signs, electronic medical records, and chemical processing.

In another embodiment, a method for identifying a patient at risk of sepsis comprises collecting a dataset of at least one vital sign of the patient, defining a state equation according to the collected dataset, defining a temporal difference variable, incorporating the temporal difference variable into the state equation in order to form a linear dynamic system model, and forecasting the onset of sepsis in the patient according to the linear dynamic system model.

In an embodiment, the dataset of at least one vital sign of the patient comprises a dataset with an irregular temporal sampling rate.

In another embodiment, the method comprises estimating at least one parameter associated with the linear dynamic system model according to historical vital sign data. The at least one parameter comprises at least one parameter indicative of temporal dynamics. In an embodiment, the linear dynamic system model comprises a KF3 model and the temporal difference variable is a temporal evolving parameter of the KF3 model.

In another embodiment, the dataset of at least one vital sign of the patient comprises at least one of body temperature, heart rate, respiratory rate, and white blood cell count.

In another embodiment, a clinical decision support system comprises at least one dataset collection module configured to collect data; a processor-readable medium storing computer code representing instructions to cause a process for identifying content, relevance, the computer code comprising code to define a state equation according to the collected dataset with the irregular temporal sampling rate, define a temporal difference variable to account for the irregular temporal sampling rate, incorporate the temporal difference variable into the state equation in order to form a linear dynamic system model, and forecast future expected data in the dataset according to the linear dynamic system model.

In another embodiment, the clinical decision support system further comprises computer code configured for estimating at least one parameter associated with the linear dynamic system model according to historical data. The at least one parameter comprises at least one parameter indicative of temporal dynamics.

In an embodiment, the linear dynamic system model comprises a KF2 model. In another embodiment, the linear dynamic system model comprises a KF3 model. In yet another embodiment of the clinical decision support system of the temporal difference variable is a temporal evolving parameter of the KF3 model.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for detecting a medical condition of a patient by data forecasting using machine learning, comprising:
   collecting a dataset from a medical sensor monitoring a patient, said dataset comprising an irregular temporal sampling rate;
   defining a state equation according to said collected dataset with said irregular temporal sampling rate;
   defining a temporal difference variable to account for said irregular temporal sampling rate;
   incorporating said temporal difference variable into said state equation in order to form a linear dynamic system model based on machine learning, wherein said linear dynamic system model directly models an irregularly sampled time-series by incorporating said temporal difference variable, wherein said linear dynamic system model is directly fitted to irregularly sampled data without any intermediate transformations; and
   forecasting future expected data in said dataset according to said linear dynamic system model, wherein said future expected data provides an indication of a medical condition of said patient.

2. The method of claim 1 further comprising estimating by said machine learning at least one parameter associated with said linear dynamic system model according to historical data.

3. The method of claim 2 wherein said at least one parameter comprises at least one parameter indicative of temporal dynamics and wherein said temporal difference variable is represented by a variable $\Delta$ and is defined by an equation as follows $\Delta^i_{t_u,t_v} = t_u - t_v$, wherein for an observation sequence, given a pair of observations instances $t_u$ and $t_v$, with u≥v, $\Delta$ further comprises a p dimensional vector if an $i^{th}$ data dimension is observed at $t_u$ and $t_v$ and otherwise observed at zero and wherein p represents a number and wherein $i^{th}$ represents a number.

4. The method of claim 1 wherein said linear dynamic system model comprises a KF3 model.

5. The method of claim 4 wherein said temporal difference variable associated with said KF3 model is derived from said state equation.

6. The method of claim 5 wherein said temporal difference variable is a temporal evolving parameter of said KF3 model.

7. The method of claim 6 wherein said dataset comprises data comprising:
patient vital signs associated with said patient;
electronic medical records associated with said patient; and
chemical processing associated with said patient.

8. A method for identifying a patient at risk of sepsis by data forecasting using machine learning, comprising:
collecting a dataset of at least one vital sign of said patient from a medical sensor monitoring said patient;
defining a state equation according to said collected dataset;
defining a temporal difference variable;
incorporating said temporal difference variable into said state equation in order to form a linear dynamic system model based on machine learning, wherein said linear dynamic system model directly models an irregularly sampled time-series by incorporating said temporal difference variable, wherein said linear dynamic system model is directly fitted to irregularly sampled data without any intermediate transformations; and
forecasting an onset of sepsis in said patient according to said linear dynamic system model.

9. The method of claim 8 wherein said dataset of at least one vital sign of said patient comprises a dataset with an irregular temporal sampling rate and wherein said temporal difference variable is represented by a variable $\Delta$ and is defined by an equation as follows $\Delta^i_{t_u,t_v}=t_u-t_v$, wherein for an observation sequence, given a pair of observations instances $t_u$ and $t_v$, with $u \geq v$, $\Delta$ further comprises a p dimensional vector if an $i^{th}$ data dimension is observed at $t_u$ and $t_v$ and otherwise observed at zero and wherein p represents a number and wherein $i^{th}$ represents a number.

10. The method of claim 9 further comprising estimating by machine learning at least one parameter associated with said linear dynamic system model according to historical vital sign data.

11. The method of claim 10 wherein said at least one parameter comprises at least one parameter indicative of temporal dynamics.

12. The method of claim 10 wherein said linear dynamic system model comprises a KF3 model comprising two filters.

13. The method of claim 12 wherein said temporal difference variable is a temporal evolving parameter of said KF3 model.

14. The method of claim 13 wherein said dataset of at least one vital sign of said patient comprises:
a body temperature of said patient;
a heart rate of said patient;
a respiratory rate of said patient; and
a white blood cell count associated with said patient.

15. A clinical decision support system for detecting a medical condition of a patient, comprising:
at least one dataset collection module configured to collect a dataset data from a medical sensor monitoring a patient;
a non-transitory processor-readable medium storing computer code representing instructions to cause a process for identifying content relevance, said computer code comprising code to:
define a state equation according to said dataset with said irregular temporal sampling rate, said dataset collected from said medical sensor by said at least one dataset collection module;
define a temporal difference variable to account for said irregular temporal sampling rate;
incorporate said temporal difference variable into said state equation in order to form a linear dynamic system model based on machine learning, wherein said linear dynamic system model directly models an irregularly sampled time-series by incorporating said temporal difference variable, wherein said linear dynamic system model is directly fitted to irregularly sampled data without any intermediate transformations; and
forecast future expected data in said dataset according to said linear dynamic system model, wherein said future expected data provides an indication of a medical condition of said patient.

16. The clinical decision support system of claim 15 further comprising computer code configured for:
estimating by said machine learning at least one parameter associated with said linear dynamic system model according to historical data.

17. The clinical decision support system of claim 16 wherein said at least one parameter comprises at least one parameter indicative of temporal dynamics and wherein said temporal difference variable is represented by a variable $\Delta$ and is defined by an equation as follows $\Delta^i_{t_u,t_v}=t_u-t_v$, wherein for an observation sequence, given a pair of observations instances $t_u$ and $t_v$, with $u \geq v$, $\Delta$ further comprises a p dimensional vector if an $i^{th}$ data dimension is observed at $t_u$ and $t_v$ and otherwise observed at zero and wherein p represents a number and wherein $i^{th}$ represents a number.

18. The clinical decision support system of claim 15 wherein said linear dynamic system model comprises a KF3 model.

19. The clinical decision support system of claim 18 wherein said temporal difference variable associated with said KF3 model is derived from said state equation.

20. The clinical decision support system of claim 19 wherein said temporal difference variable is a temporal evolving parameter of said KF3 model.

* * * * *